W. M. FAWCETT & G. L. SWABB.
LOCOMOTIVE.
APPLICATION FILED APR. 22, 1915.

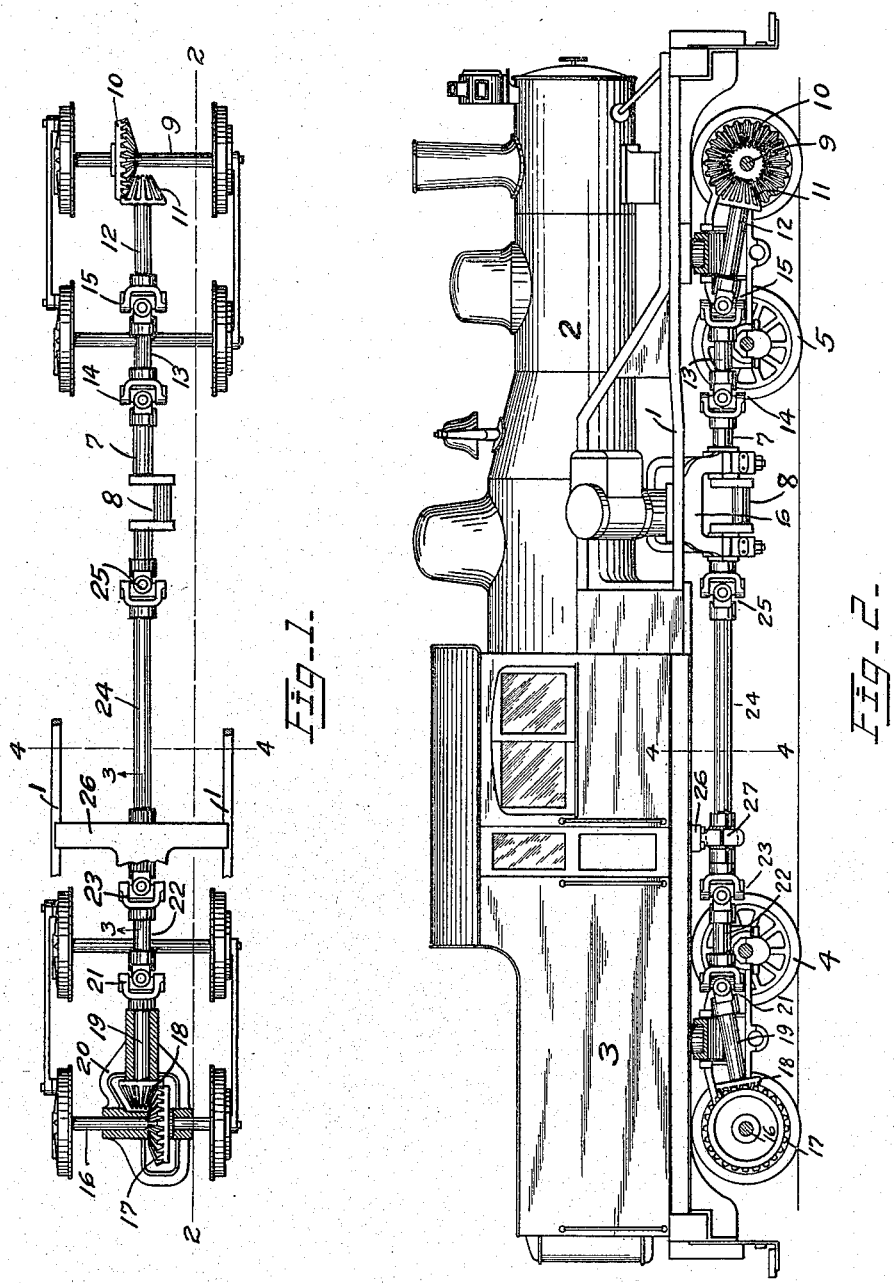

1,176,745.

Patented Mar. 28, 1916.
2 SHEETS—SHEET 2.

Witnesses
B. M. Hartman
Mrs. B. A. Brugger

Inventor
William M. Fawcett
George L. Swabb
By
Attorneys

UNITED STATES PATENT OFFICE.

WILLIAM M. FAWCETT AND GEORGE L. SWABB, OF ERIE, PENNSYLVANIA, ASSIGNORS TO HEISLER LOCOMOTIVE WORKS, OF ERIE, PENNSYLVANIA, A CORPORATION OF PENNSYLVANIA.

LOCOMOTIVE.

1,176,745.   Specification of Letters Patent.   Patented Mar. 28, 1916.

Application filed April 22, 1915. Serial No. 23,055.

*To all whom it may concern:*

Be it known that we, WILLIAM M. FAWCETT and GEORGE L. SWABB, citizens of the United States, residing at Erie, in the county of Erie and State of Pennsylvania, have invented new and useful Improvements in Locomotives, of which the following is a specification.

This invention relates to locomotives and consists in certain improvements in the construction thereof as will be hereinafter fully described and pointed out in the claims.

More particularly the invention relates to a type of locomotive commonly termed geared locomotives in which the driving shaft extends longitudinally and centrally of the locomotive.

Difficulty has been experienced in properly supporting the driving shaft and the object of this invention is to correct this difficulty.

The invention is illustrated in the accompanying drawings as follows:—

Figure 3:
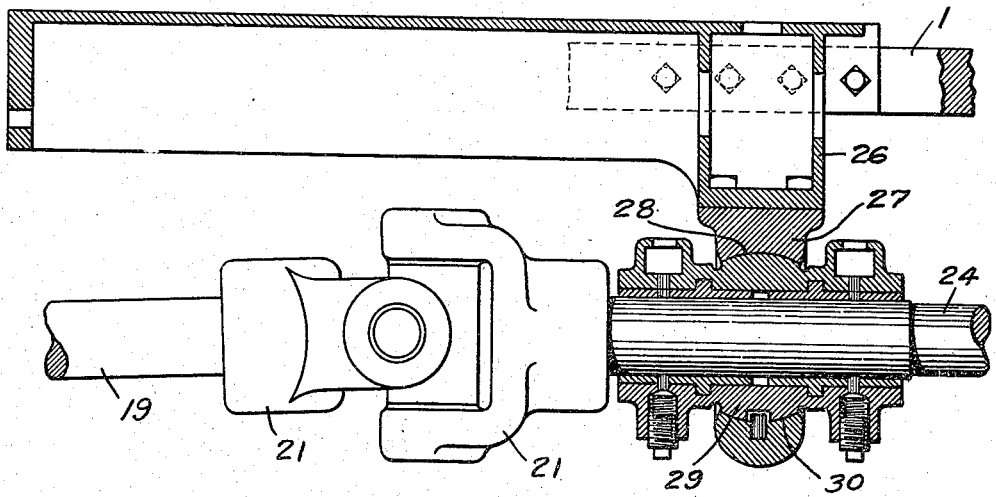
Figure 4:
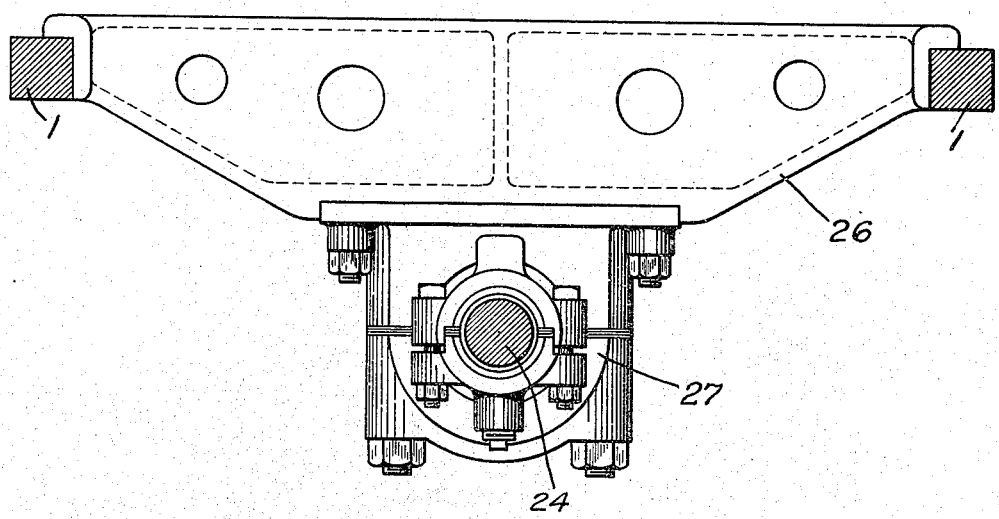

Figure 1 shows a plan view of the locomotive trucks, a portion of the frame and the driving shaft. Fig. 2 a side elevation of the locomotive, the trucks being partly in section to better show construction on the line 2—2. Fig. 3 a section on the line 3—3 in Fig. 1. Fig. 4 a section of a portion of the frame on the line 4—4 in Fig. 1.

1 marks the frame, 2 the boiler, 2ª the fire box, 3 the tender, 4 the rear truck, 5 the forward truck and 6 the engine. These in their general arrangement are old. The engine operates upon a crank 8 formed in the engine shaft 7. This is preferably at the center of the locomotive and extends longitudinally thereof. The front axle 9 of the front truck has a gear 10. A gear 11 meshes the gear 10, the gear 11 being mounted on a shaft 12. The shaft 12 is connected with the engine shaft by means of a shaft 13. The shaft 13 has the joints 14 and 15 connecting it with the shafts 7 and 12 respectively. The rear truck has the rear driving axle 16. A gear 17 is fixed on this axle. A gear 18 meshes the gear 17. The gear 18 is mounted on the gear shaft 19. The gear shaft is journaled in a bearing 20 carried by the rear truck. A floating shaft 22 is connected with the gear shaft 19 by means of a swinging or knuckle joint 21. The floating shaft 22 is connected with a longitudinal shaft 24 by means of a swinging or knuckle joint 23. The longitudinal shaft 24 is connected with the engine shaft 7 by means of a swinging or knuckle joint 25.

Heretofore the longitudinal shaft 24 has been carried directly to the joint 21 so that the weight of the shaft 24 has been carried by the bearing 20. The tendency of this shaft has been to interfere with the free running of the gear 18. In the present invention we provide a bearing for the rear end of the longitudinal shaft 24 which bearing is carried by the frame of the locomotive and then connect the longitudinal shaft by the floating shaft 22 with the gear shaft 19. The frame is provided with the cross beam 26. The bearing support 27 extends downwardly from the beam 26. It has the ball socket 28. The bearing 29 has a ball surface 30 thus forming a universal joint between the bearing support and the bearing. This permits of the bearing alining itself with the longitudinal shaft during the distortion or swaying of the frame under the stress of uneven track. This bearing supporting the rear end of the longitudinal shaft makes the load carried by the bearing 20 only that of the shaft 19 and the short floating shaft 22. Experience has shown that it is feasible to support this weight even with the jar and shock to which it is subjected by being directly carried by the truck.

Preferably the engine is placed in front of the fire box but under most conditions the arrangement of the fire box will preclude the placing of the engine centrally between the trucks so that there is in one direction or the other a longitudinal shaft of considerable length. The present invention obviates the difficulty produced by this condition.

What we claim as new is:—

1. In a locomotive, the combination of a frame; a front truck; a rear truck; a boiler; an engine carried by the frame; an engine shaft extending longitudinally of the locomotive; a driving axle on one of the trucks; an axle gear on said axle; a shaft gear meshing said axle gear; a gear shaft on which the shaft gear is mounted; a bearing carried by the truck in which said gear shaft is journaled; a longitudinal shaft in extension of the engine shaft; a floating shaft between the longitudinal shaft and the gear shaft, the floating shaft having a swinging connection with the longitudinal shaft and gear shaft; and a bearing carried by the frame for the longitudinal shaft, said bearing being adjacent to the joint between the floating shaft and the longitudinal shaft.

2. In a locomotive, the combination of a frame; a front truck; a rear truck; a boiler; an engine carried by the frame; an engine shaft extending longitudinally of the locomotive; a driving axle on one of the trucks; an axle gear on said axle; a shaft gear meshing said axle gear; a gear shaft on which the shaft gear is mounted; a bearing carried by the truck in which said gear shaft is journaled; a longitudinal shaft in extension of the engine shaft; a floating shaft between the longitudinal shaft and the gear shaft, the floating shaft having a swinging connection with the longitudinal shaft and gear shaft; a bearing for the longitudinal shaft, said bearing being adjacent to the joint between the floating shaft and the longitudinal shaft; and a bearing support carried by the frame and having a swivel connection with said bearing for the longitudinal shaft.

3. In a locomotive, the combination of a frame; a front truck; a rear truck; a boiler; a fire box; an engine carried by the frame in front of the fire box; an engine shaft extending longitudinally of the locomotive; a driving axle on the rear truck; an axle gear on said axle; a shaft gear meshing said axle gear; a gear shaft on which the shaft gear is mounted; a bearing carried by the truck in which said gear shaft is journaled, the rear truck; a longitudinal shaft in extension of the engine shaft; a floating shaft between the longitudinal shaft and the gear shaft, said floating shaft having a swinging connection with the longitudinal shaft and gear shaft; and a bearing carried by the frame for the longitudinal shaft, said bearing being adjacent to the rear truck.

4. In a locomotive, the combination of a frame; a front truck; a rear truck; a boiler; a fire box; an engine carried by the frame in front of the fire box; an engine shaft extending longitudinally of the locomotive; a driving axle on said rear truck, said axle being arranged at the rear of said truck; an axle gear on said axle; a shaft gear meshing said axle gear; a gear shaft on which the shaft gear is mounted; a bearing carried by the truck in which said gear shaft is journaled, the rear truck; a longitudinal shaft in extension of the engine shaft; a floating shaft between the longitudinal shaft and the gear shaft, said floating shaft having a swinging connection with the longitudinal shaft and gear shaft; and a bearing carried by the frame for the longitudinal shaft, said bearing being adjacent to the rear truck.

5. In a locomotive, the combination of a frame; a front truck; a rear truck; a boiler; a fire box; an engine carried by the frame in front of the fire box; an engine shaft extending longitudinally of the locomotive; a driving axle on said rear truck, said axle being arranged at the rear of said truck; an axle gear on said axle; a shaft gear meshing said axle gear; a gear shaft on which the shaft gear is mounted; a bearing carried by the truck in which said gear shaft is journaled, the rear truck; a longitudinal shaft in extension of the engine shaft; a floating shaft between the longitudinal shaft and the gear shaft, said floating shaft having a swinging connection with the longitudinal shaft and gear shaft; a bearing for the longitudinal shaft, said bearing being adjacent to the rear truck; and a bearing support for said bearing for the longitudinal shaft having a swivel connection with said bearing for the longitudinal shaft, said support being mounted on the frame.

In testimony whereof we have hereunto set our hands in the presence of two subscribing witnesses.

WILLIAM M. FAWCETT.
GEORGE L. SWABB.

Witnesses:
H. R. JEFFS,
D. E. SHREVE.

Copies of this patent may be obtained for five cents each, by addressing the "Commissioner of Patents, Washington, D. C."